United States Patent
Bjelosevic et al.

(10) Patent No.: US 9,813,825 B2
(45) Date of Patent: Nov. 7, 2017

(54) INSTRUMENT WITH REMOTE OBJECT DETECTION UNIT

(71) Applicant: Oticon A/S, Smørum (DK)

(72) Inventors: Adis Bjelosevic, Smørum (DK); Ole Fogh Olsen, Smørum (DK)

(73) Assignee: OTICON A/S, Smørum (DK)

(*) Notice: Subject to any disclaimer, the term of this patent is extended or adjusted under 35 U.S.C. 154(b) by 0 days.

(21) Appl. No.: 14/699,060

(22) Filed: Apr. 29, 2015

(65) Prior Publication Data
US 2015/0319542 A1  Nov. 5, 2015

(30) Foreign Application Priority Data
Apr. 30, 2014 (EP) .................................. 14166645

(51) Int. Cl.
*H04R 25/00* (2006.01)
*G01S 13/06* (2006.01)

(52) U.S. Cl.
CPC ............ *H04R 25/405* (2013.01); *G01S 13/06* (2013.01); *H04R 2225/41* (2013.01)

(58) Field of Classification Search
CPC .............. H04R 25/405; H04R 2499/15; H04R 2225/025; H04R 2225/021; H04R 2225/023; H04R 2225/0261; H04R 25/402; H04R 25/407
USPC ................................................. 381/312, 313
See application file for complete search history.

(56) References Cited

U.S. PATENT DOCUMENTS

| | | | |
|---|---|---|---|
| 4,586,195 A | 4/1986 | DeGeorge et al. | |
| 2003/0154017 A1 | 8/2003 | Ellis | |
| 2004/0175008 A1 | 9/2004 | Roeck et al. | |
| 2004/0246167 A1 | 12/2004 | Kumon et al. | |
| 2012/0008807 A1* | 1/2012 | Gran | H04R 25/407 381/313 |
| 2012/0274502 A1* | 11/2012 | Hyde | G01S 7/412 342/175 |
| 2012/0280824 A1* | 11/2012 | Zelepugas | H04R 1/1041 340/670 |

FOREIGN PATENT DOCUMENTS

| | | |
|---|---|---|
| EP | 1 983 799 A1 | 10/2008 |
| WO | WO 2011/040816 A1 | 4/2011 |
| WO | WO 2012/093345 A1 | 7/2012 |

* cited by examiner

*Primary Examiner* — Sunita Joshi
(74) *Attorney, Agent, or Firm* — Birch, Stewart, Kolasch & Birch, LLP

(57) ABSTRACT

The present disclosure relates to an apparatus having a directional microphone system having adaptable directionality and a remote object detection unit configured to detect a remote object by detecting a transmitted signal reflected from the object, the directionality of the directional microphone system may be modified or adapted based on the detection of the remote object.

19 Claims, 1 Drawing Sheet

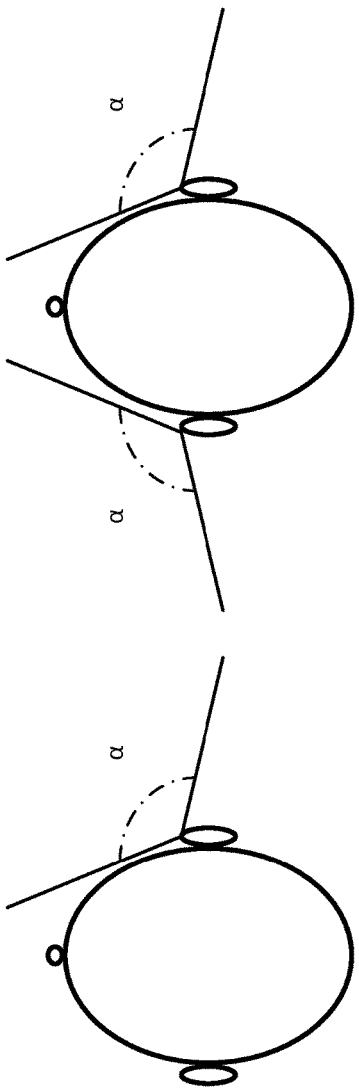
Fig. 1
Fig. 2
Fig. 3
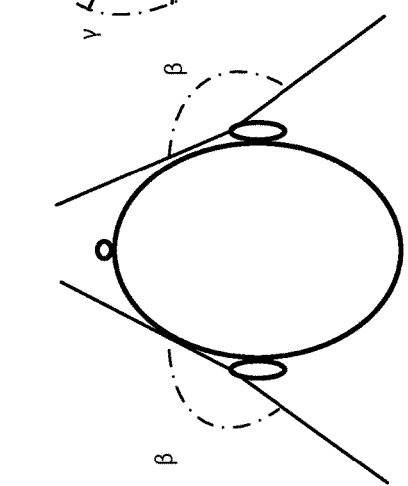
Fig. 4
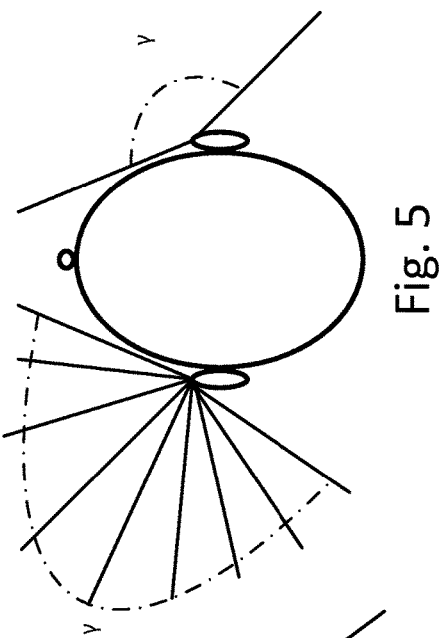
Fig. 5
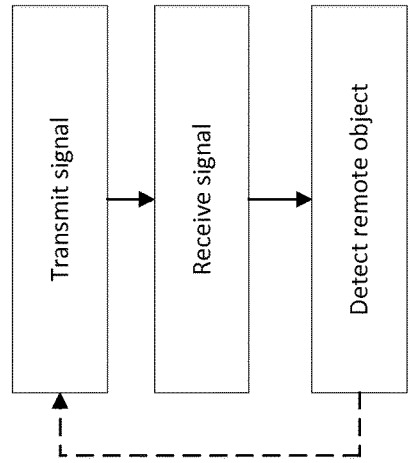
Fig. 6

INSTRUMENT WITH REMOTE OBJECT DETECTION UNIT

FIELD OF THE DISCLOSURE

The present disclosure relates to an instrument having a remote object detection unit for detecting remote objects. Moreover, the present disclosure relates to a method for detecting remote objects using an instrument having a remote object detection unit.

BACKGROUND

Sound processing in environments having multiple sound sources is cumbersome and detection and separation of active sound sources is an active field when using instruments having directional microphone systems.

Persons with hearing loss usually have a hard time in crowded areas and areas with heavy traffic, putting themselves in danger of being hit by a vehicle, e.g. a car, a bus, a bicycle or the like. Further, people with hearing loss and reduced eyesight are even more exposed to dangers in traffic.

Hence, an improved apparatus would be advantageous. It is a further object of the present disclosure to provide an alternative to the prior art.

In particular, it may be seen as an object of the present disclosure to provide an apparatus that solves, at least alleviates or provides an alternative the above mentioned problems of the prior art with enhancing sounds from desired sources and/or provides warnings of impinging dangers.

SUMMARY

Thus, the above described object and several other objects are intended to be obtained in a first aspect by providing an apparatus having a housing. The apparatus comprising a directional microphone system having adaptable directionality. The apparatus comprising a processor for adapting the adaptable directionality of the directional microphone system. The apparatus comprising a remote object detection unit configured to detect a remote object by detecting a transmitted signal reflected from the object, the processor being adapted to direct the directionality of the directional microphone system based on the detection of the remote object. The remote object detection unit allows detection of remote objects, which detection may be used to control the directional microphone system and/or warning of the user. The remote object detection unit is adapted to transmit and/or receive independently of the directional microphone system.

A second aspect relates to a method of operating an apparatus having a directional microphone system having adaptable directionality, a processor for adapting the adaptable directionality of the directional microphone system, and a remote object detection unit configured to detect a remote object. The method comprising a step of transmitting from the remote object detection unit an electromagnetic signal. The method comprising a step of receiving at the remote object detection unit a reflected electromagnetic signal. The method comprising a step of determining whether a remote object is present based on the reflected electromagnetic signal and the relative direction to the remote object. The steps of transmitting and receiving may be performed iteratively so as to sweep a number of sections iteratively or according to a schedule or scheme.

In general, the embodiments of the disclosure preferably seeks to mitigate, alleviate or eliminate one or more of the above mentioned disadvantages singly or in any combination. The method according to the second aspect may also be used for aiding a blind-source separation algorithm as detecting the presence of an object may help the algorithm to more quickly separate sources.

The method as disclosed may be embodied in a computer program product being adapted to enable a computerized system comprising at least one apparatus having data storage means in connection therewith to control a remote object detection unit in an apparatus according to the first aspect of the disclosure.

The individual features of each aspect may each be combined with any or all features of the other aspects. These and other aspects, features and/or advantages will be apparent from and elucidated with reference to the embodiments described hereinafter.

BRIEF DESCRIPTION OF THE FIGURES

The apparatus/method will now be described in more detail with regard to the accompanying figures. The figures illustrates exemplary implementations and is not to be construed as being limiting to other possible embodiments falling within the scope of the attached claim set.

FIG. 1 schematically illustrates a hearing aid positioned at an ear of a person, FIG. 2 schematically illustrates a head of a user where a hearing aid is placed at a right ear where a remote object detection device scans in an angle of α degrees, FIG. 3 schematically illustrates a head of a user where a hearing aid is placed at each ear where each remote object detection device scans in an angle of α degrees, FIG. 4 schematically illustrates a head of a user where a hearing aid is placed at each ear where each remote object detection device scans in an angle of β degrees, FIG. 5 schematically illustrates a head of a user where a hearing aid is placed at each ear where each remote object detection device scans in an angle of γ degrees, and FIG. 6 schematically illustrates steps of a method.

DETAILED DESCRIPTION OF AN EMBODIMENT

The figures are schematic and simplified for clarity, and they just show details to improve the understanding of the claims, while other details are left out. Throughout, the same reference numerals are used for identical or corresponding parts.

FIG. 1 schematically illustrates an apparatus 10 having a housing. The apparatus is positioned at an ear of a person and comprises two parts or housings. One housing is positioned behind the ear, and one housing is positioned at the ear canal or ear canal opening. The two parts or housings are connected by connector. The apparatus illustrated is a hearing aid, but the functionality described herein could also be used in a hand-held microphone, or even in a stationary device, e.g. a conference telephone or device connected to e.g. a TV.

The apparatus 10 comprises a directional microphone system in the housing, which directional microphone system has adaptable directionality. This directional microphone system could for instance be established using two, three or even more, omnidirectional microphones positioned spaced apart by a known distances. By using combinations of the signals from two, three more microphones allows establishment of a directional microphone system. This combination could include delay and/or phase-shift of the signal. The apparatus 10 further comprises a processor for adapting the adaptable directionality of the directional microphone system. This processor performs the needed adaptation of the directionality. The adaptation may include acoustic processing for identifying sound sources. Often hearing aids are equipped with directional microphone system so that sound is picked up from a preferred direction, such as substantially from in front of a person using the hearing aid.

Sound processing algorithms may be used to track the relative movement of a sound source identified via the directional microphone system. In addition to this, or in the alternative, a remote object detection unit may be employed. The remote object detection unit is configured to detect a remote object, such as a person or an inanimate object, by detecting a transmitted signal which has been reflected from the object. This operation is similar to the operation of a maritime 3 or 10 cm radar; however, at e.g. 79 GHz the wavelength is suitable for small form factor, low-power modules, which may be incorporated in housings to be worn at an ear of a person or held in the hand. Such devices may be incorporated in a 28 nm CMOS RFIC design.

Advantageously the processor is then adapted to direct the directionality of the directional microphone system based on the detection of the remote object.

For conserving power, the remote object detection unit detects may be set up to sweep a certain angle interval relative to the housing. In order not to expose the head to excessive electromagnetic power or electromagnetic power over a longer period of time, the remote object detection unit may be configured to sweep an area or angle at certain intervals. The remote object detection unit may be setup for detecting objects according to previously detected object, e.g. if one object has been identified recently, a scheme for sweeping may be adapted accordingly. This scheme could be aimed at detecting new sound sources and/or to maintain the direction of the directional microphone system pointed at the sound source, which may be shifted due to head movements and/or the sound source moving. In environments where multiple people are present, e.g. the classic cocktail party scenario, the remote object detection unit may be used to keep track of possible sound sources, and the directional microphone system and the accompanying audio processing algorithms, may then be used to point out the desired sound target from the identified possible sound sources. This may alleviate the sound processing as less time and processing is used to identify active sound targets.

Generally, the remote object detection unit may be configured to transmit, and receive, an electromagnetic signal having a carrier frequency within the 1 to 100 GHz frequency range.

When this remote object detection unit is included in a housing carried by a person, it is possible to determine the speed of a detected remote object, or at least the relative speed of the detected remote object. This could be done using the Doppler effect, which also provides information on the relative movement of the remote object, i.e. closing in or moving away. The determined speed, possibly along with the direction, could be used to determine if imminent danger of collision. This could be advantageous when the user is moving around in a busy environment, such as a city centre with cars, busses, trucks, bicycles and people. A speaker unit could then provide an acoustic signal upon detection of a remote object having a speed above a given threshold, as this could indicate e.g. an approaching vehicle. The remote object detection unit could also be used as a proximity warning system indicating that an object is within a given distance from the user. Combinations of the properties of the remote objects may also be used, e.g. an approaching vehicle having a speed above some threshold within a given distance will cause the speaker to emit a sound. Further, a small vibrational unit may be included in the housing to provide a vibrational sensation at the ear. For binaural systems, that is system with a hearing aid at each ear, it is also possible to provide directionality the warning, so that if something is approaching from the left, a warning is given at the left ear, etc.

Depending on the resolution level of the remote object detection unit, it is possible to characterise the remote object as one of: a person, a car, a bicycle, a fixed metallic object.

Overall, the apparatus is described as a hearing aid but could also be a hand-held microphone, a wearable device or a stationary device. An example of a stationary device could be a so-called TV-box.

FIG. 2 schematically illustrates a head of a user where a hearing aid is placed at a right ear where a remote object detection device scans in an angle of $\alpha$ degrees. The angle a may be determined by the characteristics of the antenna used. As illustrated in FIG. 4 the angle may be larger than shown in FIG. 1.

FIG. 3 schematically illustrates a head of a user where a hearing aid is placed at each ear where each remote object detection device scans in an angle of $\alpha$ degrees. By having two hearing aids each scanning an area the combined area scanned is larger, and thereby the security established for the user. Further, the larger area allows tracking and/or detection of people speaking in front of the user.

FIG. 4 schematically illustrates a head of a user where a hearing aid is placed at each ear where each remote object detection device scans in an angle of $\beta$ degrees. Generally the angular restriction could extend backwards of the head so as to allow the directional microphone system to adapt and pick up sounds emanating from behind the user, e.g. a caretaker pushing a wheel chair.

FIG. 5 schematically illustrates a head of a user where a hearing aid is placed at each ear where each remote object detection device scans in an angle of $\gamma$ degrees. Each angular section is divided into a number of subsections. The subsections are illustrated as being separated, but in practice there will be some overlap due to the directionality characteristics of the antenna used for the remote object detection unit. As mentioned, the subsections may be scanned consecutively, randomly or according to a fixed scheme. Whichever method is used, the method may be adapted according to which environment the user is in.

FIG. 6 schematically illustrates steps of a method of operating an apparatus having a directional microphone system having adaptable directionality, a processor for adapting the adaptable directionality of the directional microphone system, and a remote object detection unit configured to detect a remote object. Such an apparatus could be an apparatus as discussed in relation to FIGS. 1-5. The method comprises a step of transmitting from the remote object detection unit an electromagnetic signal. The method comprises a step of receiving at the remote object detection unit a reflected electromagnetic signal. The remote object detection unit thus emits a signal in a given direction and awaits an echo. This allows detecting an angular direction to the remote object, if present. Further processing and analysis of the echo may provide information on the speed of the remote object, e.g. based on the Doppler Effect.

The directional microphone system may then provide information on whether any detected remote object is an active sound source or not. If active, the directionality of the directional microphone system may be adapted based on the detection of a remote object directional microphone system. Advantageously, the adaptation of the directionality of the directional microphone system may be conditioned on the remote object being classified as a sound source. In the cocktail scenario, one source may be identified as a preferred source and the directional microphone system may be adapted accordingly, even if more active sound sources are identified. A combination of the remote object detection unit and the directional microphone system may be used for identifying remote active sound sources.

A classification of the remote object may include determining if the remote object is a human or a machine. This could be used for automatically determining if a warning signal should be issued for warning the user of an approaching vehicle.

The remote object detection unit can be used to detect active and silent remote objects and the directionality of the directional microphone system could be used for scanning the remote objects detected by the remote object detection unit to classify them as active or silent.

As described above, the method may include determining speed of remote object, and provided the speed is above a threshold, the method comprises issuing a warning signal.

Combinations of the above embodiments and many other embodiments will be apparent to those of skill in the art upon reading and understanding the above description.

The apparatus and/or method steps as set out in the claims may be implemented by means of hardware, software, firmware or any combination of these. Some of the features could also be implemented as software running on one or more data processors and/or digital signal processors.

The individual elements of any of the disclosed embodiments may be physically, functionally and logically implemented in any suitable way such as in a single unit, in a plurality of units or as part of separate functional units. It is intended that the structural features of the devices described above, in the detailed description and in the claims may be combined with steps of the method, when appropriately substituted by a corresponding process. Embodiments of the method have the same advantages as the corresponding systems.

Although the present disclosure discusses specific embodiments, the claims should not be construed as being in any way limited to the presented examples. Although specific embodiments have been illustrated and described herein, it will be appreciated by those of ordinary skill in the art, that any arrangement which is calculated to achieve the same purpose may be substituted for the specific embodiments shown. The scope of protection is defined by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the claims. Furthermore, individual features mentioned in different claims, may possibly be advantageously combined, and the mentioning of these features in different claims does not exclude that a combination of features is not possible and advantageous.

The invention claimed is:

1. A hearing aid that enhances environmental sound perception from desired sources or provides warnings of impinging dangers to users with hearing loss, the hearing aid comprising:
   two housing parts, a first of the two housing parts being configured to be positioned behind an ear of the user with hearing loss, and a second of the two housing parts being configured to be positioned at the ear canal or the ear canal opening of the ear of the user
   a directional microphone system having adaptable directionality, where the directional microphone system comprises a plurality of omnidirectional microphones,
   a remote object detection unit configured to emit an electromagnetic signal and to detect a remote object by detecting an electromagnetic signal reflected off the object, and
   a processor for adapting the adaptable directionality of the directional microphone system based on the detection of the remote object, wherein the processor is adapted to enhance sound from the object according to the user's specific hearing loss.

2. The hearing aid according to claim 1, wherein the remote object detection unit is configured to transmit an electromagnetic signal having a carrier frequency within the 1 to 100 GHz frequency range.

3. The hearing aid according to claim 1, wherein the remote object detection unit is configured to determine the speed of the remote object, such as the relative speed of the remote object.

4. The hearing aid according to claim 3, further comprising a speaker unit, which provides an acoustic signal upon detection of a remote object having a speed above a threshold.

5. The hearing aid according to claim 1, wherein the remote object detection unit characterises the remote object as one of: a person, a car, a bicycle, and a fixed metallic object.

6. A hearing aid that enhances environmental sound perception from desired sources or provides warnings of impinging dangers to a user with a hearing loss, the hearing aid comprising:
   two housing parts, a first of the two housing parts being configured to be positioned behind an ear of the user with the hearing loss, and a second of the two housing parts being configured to be positioned at the ear canal or the ear canal opening of the ear of the user
   an input device for receiving a sound signal,
   a processor for processing the sound signal to compensate for the user's hearing loss,
   an output transducer for providing the processed signal to the user in a form perceivable as sound, and
   a remote object detection unit for detecting objects remote from the hearing aid by detecting reflections of an electromagnetic signal transmitted from the remote detection unit and reflected by the remote object.

7. A method of enhancing environmental sound perception from desired sources for a user with a hearing loss using a hearing aid comprising two housing parts, a first housing part being configured to be positioned behind an ear of the user with hearing loss, and a second housing part being configured to be positioned at the ear canal or the ear canal opening of the user's ear, a directional microphone system having adaptable directionality, a processor for adapting the adaptable directionality of the directional microphone sys tem, and a remote object detection unit configured to detect a remote object, the method comprising:
- transmitting from the remote object detection unit an electromagnetic signal,
- receiving at the remote object detection unit a reflected electromagnetic signal,
- determining whether a remote object is present based on the reflected electromagnetic signal and the relative direction to the remote object,
- adapting the directionality of the directional microphone system based on the detection of a remote object, and
- enhancing sound from the remote object according to the user's specific hearing loss.

8. The method according to claim 7, wherein
- the hearing aid further comprises a classifying unit for classifying objects as sound or not-sound sources, and
- the adaptation of the directionality of the directional microphone system is conditioned on the remote object being classified as a sound source.

9. The method according to claim 8, wherein the classification of the remote object includes determining if the remote object is a human or a machine.

10. The method according to claim 6, wherein the directional microphone system is used for identifying remote active sound sources.

11. The method according to claim 10, wherein the remote object detection unit detects active and silent remote objects and the directionality of the directional microphone system scans the remote objects detected by the remote object detection unit to classify them as active or silent.

12. The method according to claim 6, further comprising:
- determining speed of remote object, and provided the speed is above a threshold, the method comprises issuing a warning signal.

13. The method according to claim 7, wherein the directional microphone system is used for identifying remote active sound sources.

14. The method according to claim 8, wherein the directional microphone system is used for identifying remote active sound sources.

15. The method according to claim 9, wherein the directional microphone system is used for identifying remote active sound sources.

16. The method according to claim 7, further comprising:
- determining speed of remote object, and provided the speed is above a threshold, the method comprises issuing a warning signal.

17. The method according to claim 8, further comprising:
- determining speed of remote object, and provided the speed is above a threshold, the method comprises issuing a warning signal.

18. The method according to claim 9, further comprising:
- determining speed of remote object, and provided the speed is above a threshold, the method comprises issuing a warning signal.

19. The method according to claim 10, further comprising:
- determining speed of remote object, and provided the speed is above a threshold, the method comprises issuing a warning signal.

* * * * *